United States Patent [19]
Orain

[11] 3,975,922
[45] Aug. 24, 1976

[54] HOMOKINETIC TRANSMISSION JOINT

[75] Inventor: Michel Orain, Conflans-Sainte-Honorine, France

[73] Assignee: Glaenzer Spicer, Poissy, France

[22] Filed: May 6, 1975

[21] Appl. No.: 574,937

[30] Foreign Application Priority Data
May 13, 1974   France .............................. 74.16472

[52] U.S. Cl. .......................................... 64/21; 64/8; 64/17 R
[51] Int. Cl.² ........................................... F16D 3/30
[58] Field of Search ................. 64/8, 7, 21, 17 R

[56] References Cited
UNITED STATES PATENTS

| | | | |
|---|---|---|---|
| 2,037,281 | 4/1936 | Spicer | 64/17 R |
| 3,204,427 | 9/1965 | Dunn | 64/8 |
| 3,385,081 | 5/1968 | Wier | 64/21 |
| 3,461,688 | 8/1969 | Garfinkle | 64/21 |

Primary Examiner—Samuel Scott
Assistant Examiner—Randall Heald
Attorney, Agent, or Firm—Wenderoth, Lind & Ponack

[57] ABSTRACT

The joint allows high operational speeds and large operating angles while remaining homokinetic.

The joint comprises a bell integral with the driving shaft and defining raceways for rollers carried by trunnions. Two sets of rollers and trunnions are provided and associated respectively with two concentric shaft sections which are connected to the driven shaft and are capable of undergoing elastic torsional deformation so as to take up the phase difference between the two sets of rollers and trunnions.

28 Claims, 17 Drawing Figures

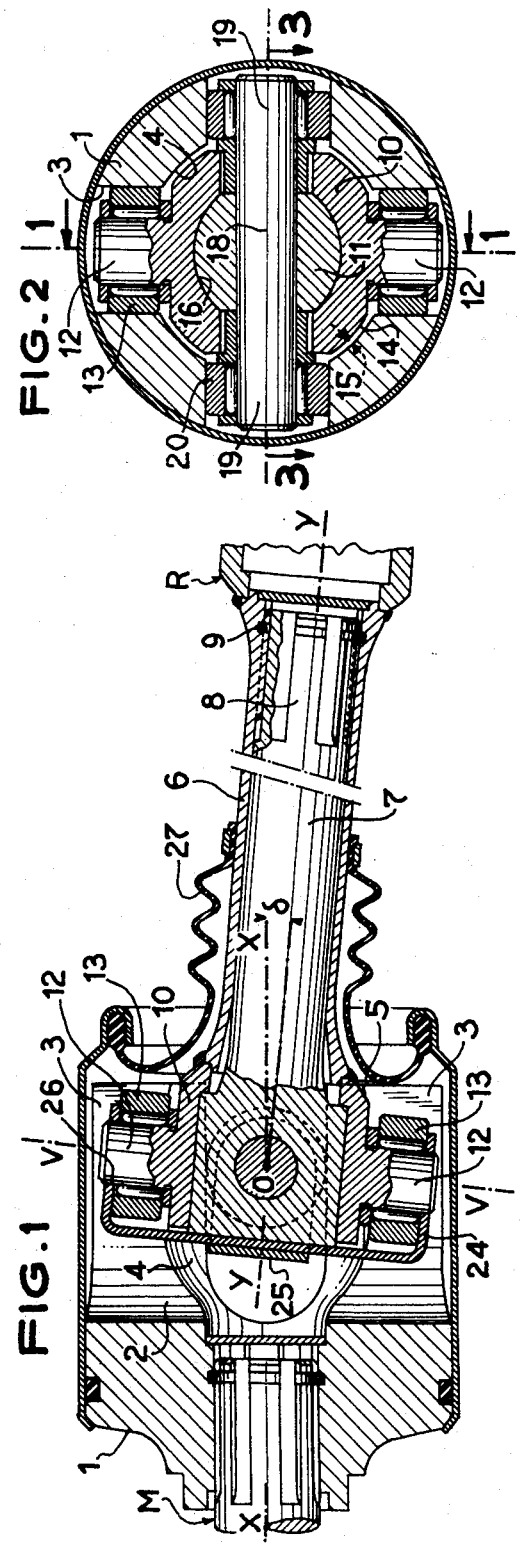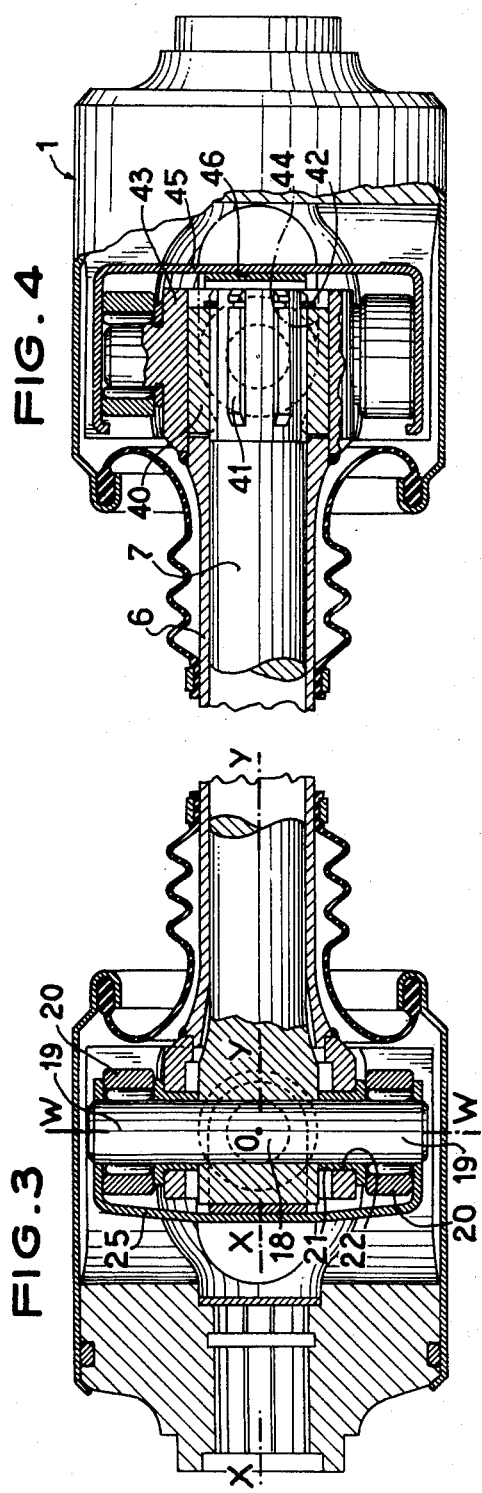

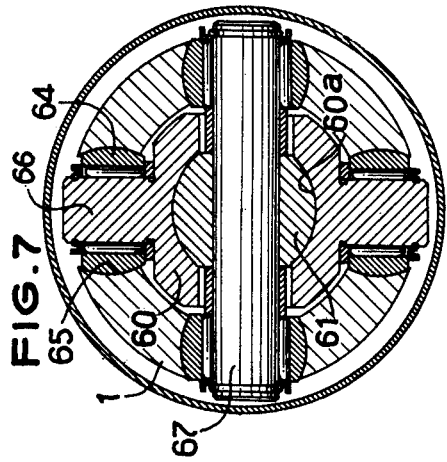
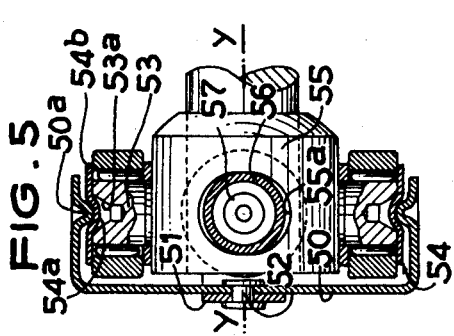
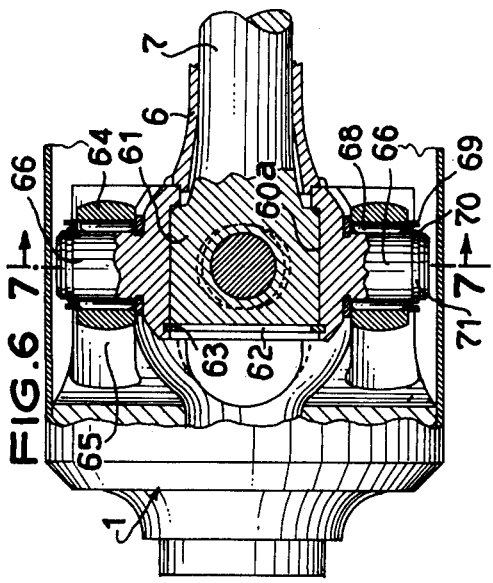
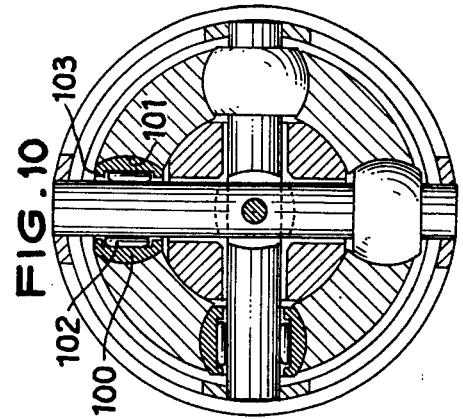
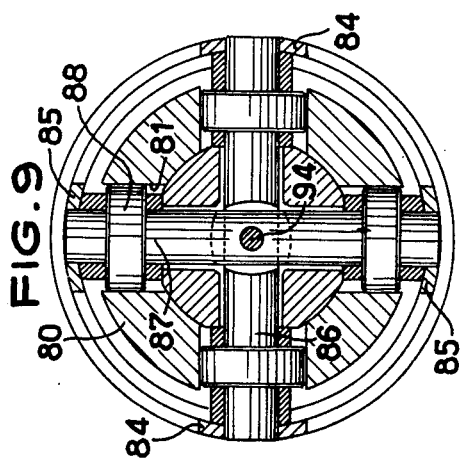
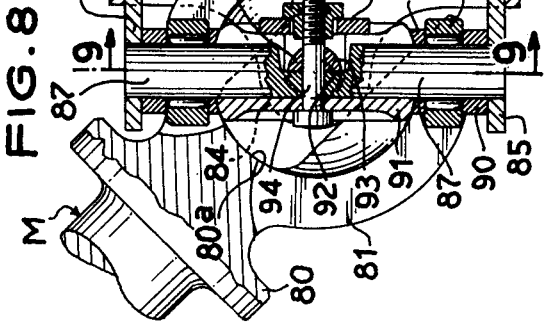

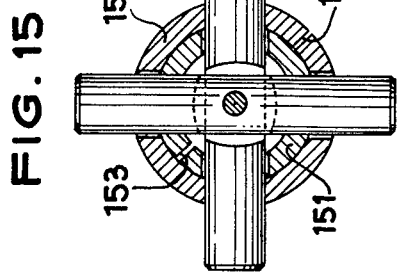
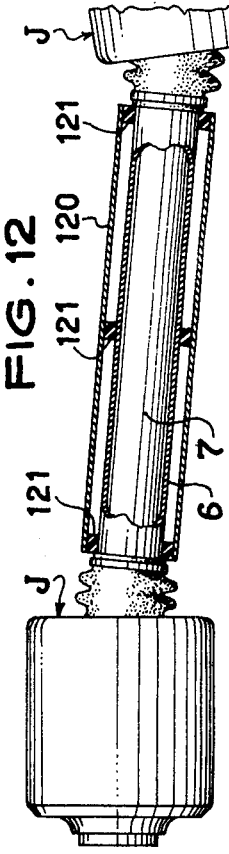
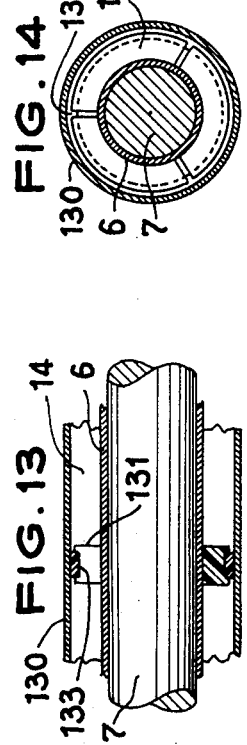
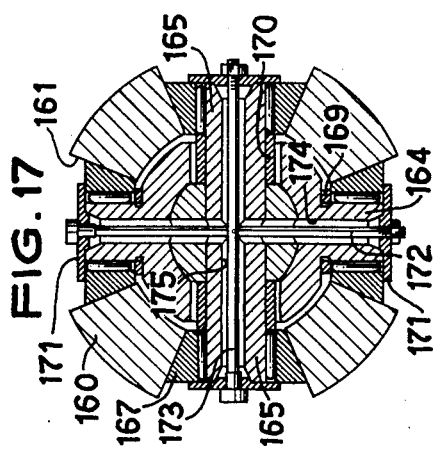
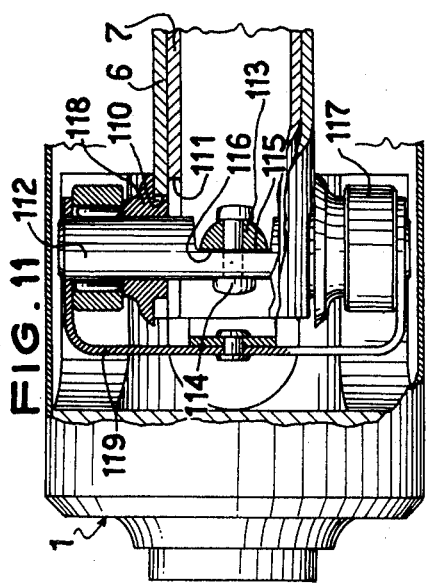
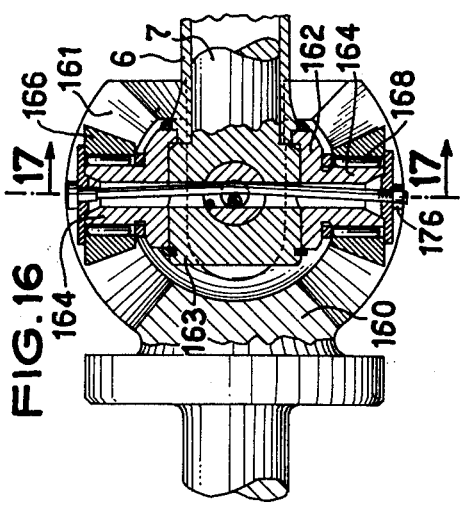

HOMOKINETIC TRANSMISSION JOINT

The present invention relates to homokinetic joints employed in many transmissions for transmitting power between a driving shaft and a driven or receiving shaft, these two shafts being capable of making therebetween a certain fixed or variable angle.

There is employed at the present time for transmitting high power between a driving shaft and a driven shaft which make therebetween fixed or variable angles which do not exceed a few degrees universal joints known under the name of Cardan or Hooke's joints. However, such joints are not homokinetic and their non-homokinetic operation accentuates roughly as the square of the operating angle, that is to say, the angle that the two shafts make with each other. Consequently, whereas for small operating angles, for example less than 4°, the consequences of this defect and in particular its dynamic effects are but little discernable, in any case in the application to the automobile vehicles, when this operating angle increases and exceeds 5° or 10°, non-homokinetic operation produces at high speeds dynamic phenomena by excitation of certain peripheral elements such as the many elastic elements present in the chassis or the body of a vehicle. The use at high speeds of such Cardan or Hooke's joints is therefore only suitable in a very narrow operating angle range of these joints.

Moreover, in most transmissions and in particular in the automobile vehicle, there must be provided a possibility of a free axial sliding allowing variations in the distance between the driving shaft and a driven shaft without substantial reaction on the bearings and without axial resistance to these variations of length. Indeed, the vibrations of the engine must not be transmitted through the transmission shaft to the receiving element, namely, in the case of an automobile vehicle, to the differential and suspension. Now, the sliding spline devices currently employed are practically locked axially upon application of the torque of utilisation. Consequently, the transmission shaft behaves then as a beam which is axially rigid and transmits all the vibrations of the engine to the receiving element integral with the chassis and this has a marked effect on the comfort of the vehicle.

In order to avoid these two defects associated with conventional transmissions having Cardan joints with sliding splines, it has been proposed to replace them by sliding homokinetic joints, for example of the type of joints having balls equipping the lateral transmissions of front-drive automobile vehicles. However, other difficulties are encountered due to the substantial mechanical losses by friction accompanying the operation of these joints which are proportional not only to the torque transmitted but also to the operating angle. Under the optimum conditions of utilisation, these losses are of the order of 5 per 1,000 of the power transmitted for an operating angle of 10°. By way of comparison, the loss in a Cardan joint is less than 1/10 of this value.

Consequently, the problem is high speed operation of such homokinetic joints is that of the rise in temperature due to the mechanical losses. Indeed, whereas in normal utilisation, namely at rotational speeds of the order of 1200 to 1,500 known joints employed in the lateral transmission of vehicles undergo only moderate temperature rises, this is no longer the case in the course of operation at speeds of the other of 5,000 to 6,000 rpm, since the power to dissipate in heat is proportional to this speed. It is then necessary, under these conditions of utilisation, to limit the operating angle to a value of the order of 3° to 5°, that is to say in fact of the same order of magnitude as in the case of a Cardan joint.

The sole remaining advantage is then the ease of axial sliding they provide with respect to devices employing sliding splines.

In the same way, the use of homokinetic joints at high speeds creates the problem of wear and therefore of their life. Indeed, if there is considered the application to the automobile vehicle, for a given number of kilometres travelled through, the number of revolutions effected by the transmission is about four times higher in the case of a high-speed transmission, for example in a longitudinal transmission shaft, than in the case of a low-speed transmission for example a lateral transmission. The resulting wear, clearances and noises therefore appear prematurely. In order to avoid this latter drawback and ensure a sufficient length of life, it is necessary to envisage costly and often prohibitive and even impossible measures comprising:

reducing the operating angle which considerably restricts the possible applications and advantages of these joints;

increasing in particular the diameter of the joints and consequently their cost;

narrowing the machining tolerances so as to conserve a wear margin and prolong the life, before the appearance of overall values of play or clearance (play due to wear + play due to machining) liable to produce unacceptable operational noises. However, the narrowing of these tolerances must not result in a stiff operation which would produce at high speed a rapid rise in temperature and a complete seizure. This narrowing of the tolerances also increases manufacturing costs.

In view of this state of the art, the problem that the present invention has for purpose to solve is the following: provide a homokinetic joint capable of operating at high speeds and at large operating angles without having the drawbacks of the conventional joints mentioned hereinbefore. It will be understood that if these maximum conditions are fulfilled, such a joint would operate particularly advantageously under less difficult conditions of utilisation.

This result is obtained in a homokinetic joint of the type comprising: a first element adapted to be connected to one of the two shafts to be connected and defining raceways, a second element to be connected to the driving shaft and carrying a plurality of trunnions these trunnions receiving rollers in contact with the respective raceways of the first element, wherein the first element defines $n$ pairs of raceways, $n$ being an even whole number exceeding or equal to 4, said pairs of raceways being disposed symmetrically 2 by 2 with respect to the axis of the associated shaft and being angularly equally spaced apart in a plane perpendicular to said axis, the other shaft comprising $n/2$ concentric shaft sections which each have a capacity to undergo an elastic torsional deformation, each of one of said $n/2$ shaft sections carrying two trunnions on which there are received the rollers in contact with the respective pairs of raceways, whereby, when the joint rotates at an angle the phase difference between the pairs of rollers is absorbed by the torsion of the concentric shaft sections.

Many embodiments of the invention may be envisaged which underline and complete the aforementioned features as will be apparent from the ensuing description with reference to the accompanying drawings in which:

FIG. 1 is a longitudinal sectional view taken on line 1—1 of FIG. 2 of a homokinetic joint according to the invention;

FIG. 2 is a cross-sectional view of the joint;

FIG. 3 is a longitudinal sectional view taken on line 3—3 of FIG. 2;

FIG. 4 is a partial longitudinal sectional view of a modification;

FIG. 5 is a partial sectional view of another modification;

FIG. 6 is a longitudinal sectional view of a modification having spherical rollers;

FIG. 7 is a cross-sectional view taken on line 7—7 of FIG. 6;

FIG. 8 is a view of another modification allowing particularly large operating angles;

FIG. 9 is a sectional view taken on line 9—9 of FIG. 8;

FIG. 10 is a cross-sectional view of another embodiment;

FIG. 11 is a longitudinal sectional view of construction modifications, and

FIG. 12 is an elevational view, with parts cut away, of a particular arrangement of two joints according to the invention;

FIG. 13 is a detailed sectional view of a modification of the arrangement shown in FIG. 12;

FIG. 14 is a sectional view taken on line 14—14 of FIG. 13;

FIG. 15 is a cross-sectional view of the utilisation of a joint according to the invention with a short connecting shaft;

FIG. 16 is a longitudinal sectional view of another embodiment, and

FIG. 17 is a cross-sectional view taken on line 17—17 of FIG. 16.

Reference will first be made to FIGS. 1 t 3 to describe in detail a first embodiment of a homokinetic joint according to the invention interposed between a driving shaft having an axis X—X and a driven or receiving shaft R having an axis Y-Y.

The joint comprises first an element 1 in the shape of a bell integral with the drawing shaft and having a skirt comprising four notches or recesses 2 defining four pairs of raceways 3 which are symmetrical two by two with respect to the axis X—X of the driving shaft. In this embodiment, the raceways are planar and parallel four by four. In the regions between these raceways the inner wall 4 of the skirt has a cylindrical shape and terminates at its free end in a flange or beading 5 the function of which will be understood hereinafter.

The tubular receiving or driven shaft R is rendered integral, for example by welding, with two concentric shaft sections 6, 7 which are coaxial with this driven shaft and interconnected at their end remote from the joint by splines 8, these two shaft sections being moreover axially interlocked, for example by a ring 9 received in grooves.

Each of the two concentric shafts 6, 7 terminates at its end adjacent the joint in a stem 10, 11 which is in one piece with the corresponding shaft or attached thereto. The stem 10 integral with the outer shaft carries two trunnions 12 which are diametrally opposed and have an axis V—V and carry rollers 13 having needles received with a very small diametral clearance in suitable raceways. This outer bipod stem has moreover on the whole a spherical shape (see at 14 in FIG. 2), a certain radial clearance 16 being provided therebetween and the bore 4 of the element 1. The aforementioned flange of the bell-shaped element axially retains the exterior bipod stem 10 so as to preclude the accidental disablement or disengagement of the rollers in the case of excessive elongating stress.

The inner stem 11 integral with the inner shaft section 7 has a cylindrical outer shape and is a running fit in a bore 16 of the outer stem. It has a bore 17 whose axis W—W is perpendicular to the axis V—V of the trunnions 12 and in which is secured a shaft 18 defining two trunnions 19 which carry rollers 20 which have needles and are received in the other two raceways disposed at 90° with respect to the first raceways. The shaft 18 extends through spacer rings 21 in apertures 22 in the outer stem 10. The rollers 13 are maintained in position inwardly by spacer members 23 whereas the rollers 20 are maintained in the same way by radial flanges on the rings 21. Further, the two pairs of rollers are maintained in position in opposition to the action of centrifugal force by two yokes 24, 25 which may be free with respect to each other as shown in FIGS. 1 and 2. These yokes comprise in their opposite branches apertures 26 engaged on the ends of the trunnions.

Rollers journalled on needles have been shown but it will be understood that they may also be mounted on a smooth bearing.

It will be observed that the shaft 18 and the two trunnions 12 ensure the friction-less precise radial centering of the concentric shaft sections 6 and 7 with respect to the element 1. Indeed, if reference is made to FIG. 2, it is observed that the shaft 18 supports the inner stem 11 vertically in the direction of the Figure and that the trunnions 12 retain the outer stem 10 laterally. As the bore 16 of this stem is a running fit on the enlargement 11, any relative radial freedom of translation of the receiving or driven sub-assembly with respect to the outer element 1 is precluded. This permits a clearance 15 to remain between the bore 4 of the element 1 and the outer surface of the stem 10 which advantageously avoids undesirable friction.

The joint is completed by protective gaiters 27 of conventional design.

By way of essential features of the invention it must be stressed that the extents of the elastic torsion of the two concentric shaft sections 6, 7 are chosen to be equal or roughly equal and that the sub-assemblies constituted by the stems, the trunnions, the rollers, the yokes etc. associated respectively with the two shaft sections have comparable, and if possible equal, inertias.

Under these conditions the operation, and in particular the homokinetic operation, of the joint just described may be explained in the following manner: when the joints turn at an angle, the two axes X—X and Y—Y making therebetween an angle δ, the four rollers 13, 20 roll on their raceways. The two rollers 13 associated with the trunnions 12 integral with the outer stem 10 turn in the same direction and at the same velocity and have with respect to the angular velocity of the driving shaft an angular difference which is always equal to and opposite to that of the second pair of rollers 20 associated with the trunnions 19, irrespective of the phase angle of the joint and its operating angle. These two differences, which are equal in absolute value and in opposite directions, are absorbed by the elastic torsions, also in opposite directions, of the two concentric shafts 6, 7, these elastic torsions of contrary directions being completely neutralized in the region of the junction between the two shaft sections, that is to say, in the region of the splines 8 in the presently-described embodiment.

It will be understood under these conditions that it is essential, if not indispensable, that the two shaft sections have equal extents of elastic torsional deformation. Note that the opposite angular differences remain low and are, for example, of the order of 0.5° for an operating angle of 10°for the joint.

Note also that this mode of homokinetic operation is quite different from the known association of the two nonhomokinetic joints placed symmetrically on each side of an intermediate element constrained to remain in the bisecting plane of the two shafts to be connected. On the contrary, according to the invention, the homokinetic operation is obtained by superimposing and cancelling out two differences which are equal in absolute value and in opposite directions resulting from the difference in phase of two joints contained in the same plane.

An exact static homokinetic operation being thus achieved, it will be observed that there is also an exact dynamic compensation since as the angular differences are equal and in opposite directions, at each given instant the kinetic moment of the assembly is constant during the rotation in as much as, as mentioned hereinbefore, the two sub-assemblies associated with each of the shaft sections 6, 7 has equal inertias. This last feature permits very high rotational velocities with operating angles of up to 10° or even 20° with no dynamic pulsation and consequently under optimum conditions of comfort.

Without listing here all the advantages of the joint according to the invention, which will be mentioned in the ensuing description, it may be nonetheless stressed that as the effective torque is transmitted through the four rollers, the capacity of the joint for a given diameter is substantially increased, with respect to the capacities of conventional joints having two rollers which are moreover neither homokinetic nor self-centered. Moreover, the arrangement according to the invention allows equally distributing the load between the rollers without requiring a particularly precise machining owing to the possibility of absorption of the contrary torsional torques in the region of the two concentric shaft sections.

There will now be described with reference to the other Figures a number of modifications which have been envisaged and are within the scope of the present invention. In these various Figures, elements which correspond to those shown in FIGS. 1 to 3 and have not been modified to a marked extent will be designated by the same reference numerals.

In FIG. 4, two modifications concern, firstly, the construction of the inner stem constituted by a member 40 which is attached to the inner shaft section 7 by splines 41 and is axially blocked on this shaft by a ring 42. The outer stem 43 may comprise notches 44 for the passage of the trunnions integral with the inner stem. Further, the two yokes 45, 46, corresponding to the yokes 44, 45 shown in FIGS. 1 and 3, are of different construction in that the ends of the branches of these yokes are fitted on the end face of the rollers and comprise flanges 47 precluding their disengagement. In this case, the yokes follow the oscillating movements of the rollers and this eliminates friction rollers and the yokes and consequently harmful overheating in particular at high velocity when the centrifugal force exerted on the rollers is high. This feature is of interest only due to the fact that, at an angle and subjected to torque, the two opposite rollers have identical instantaneous rotational velocities in the same direction.

In FIG. 5, the yokes 50, 51 are pivoted one to the other in their median region by a rivet 52 or the like and they are externally centered with respect to the rollers by means which will not be described in more detail. Each trunnion 53 comprises in its end surface and on its axis a cavity $53^a$ of frustoconical shape in which there is engaged a projecting portion $54^a$ of a thrust washer 54 against which there bears a boss $50^a$ provided on the confronting surface of the yoke. In joint operation, the end surface of the adjacent roller comes in contact with the planar portion $54^b$ of the washer. In this way the thrust washers, thus centered, may rotate together with the rollers and retain them radially against the effect of centrifugal force by bearing against the bosses of the yokes. The surface of friction is thus reduced to the region of contact between the yokes and the washer and it is located near the axis of rotation, which results in an easy rotation with no heating.

In FIG. 5, there has been shown a manner of achieving a relative axial retention of the two bipods which is different from that employed in FIGS. 1–3. In this embodiment, the outer stem 55 has openings $55^a$ of oblong shape in which there are engaged sleeves 56 corresponding for example to the spacer rings 21 shown in FIG. 3. The dimension of the oblong openings in the direction of the axis Y—Y is equal to the diameter of these sleeves whereas their dimension in the perpendicular direction exceeds this diameter. In this way, the sleeve 56 is journalled on the trunnion 57 and is capable of rolling on the rectilinear part of the oblong opening $55^a$ in the course of the relative angular movement of the two bipods while ensuring an axial positioning of the latter.

In the embodiment shown in FIGS. 6 and 7, a number of modifications are also shown: first, the axial positioning between the outer stems 60 and the inner stem 61 is achieved by means of a ring 62 received in an annular groove 63 provided in the bore $60^a$ of the outer stem. Further, it can be seen that the cylindrical rollers of the first embodiment have been replaced by spherical rollers 64 which cooperate with raceways 65 which have a circular section and substantially marry up with the spherical curvature of the rollers. In such an embodiment the retaining yokes are no longer necessary since the rollers are maintained in their raceways. In this arrangement, the rollers slide on their trunnions 66, 67 outwardly when the bipods are inclined with respect to their neutral position.

Another modification concerns the retention of the needles 68 of the rollers which is achieved in this embodiment by an L-section ring 69 maintained by an elastically yieldable ring 70 received in a semi-circular groove 71 formed at the end of the trunnion. This retaining method is particularly advantageous since it facilitates the assembly.

The embodiment shown in FIGS. 8 and 9 is more particularly intended for an application to an automobile vehicle, namely to the driving of the wheels of a front-drive vehicle. This type of joint is axially fixed in position but on the other hand permits a higher operating angle of the order of 45°.

As can be seen in FIG. 8, the member 80 integral with the driving shaft still defines four pairs of raceways 81 which are in this embodiment planar and parallel four by four, but it has a spherical inner and outer shape so as to permit the operating angles to reach the aforementioned values without a prohibitive overall size.

The two concentric shaft sections 6, 7 are integral, at their ends adjacent the joint, with two bells namely an outer bell 82 and inner bell 83 respectively. Each of these bells carries, between two diametrically opposed tabs respectively 84 and 85, a rod respectively 86, 87 which defines the trunnions on which the rollers 88 are mounted. Each roller is disposed between two spacer members 89, 90, the inner spacer member 89 bearing against a member 91 in the form of a portion of a ball joint which is received in the spherical inner part $80^a$ of the member 80. In the centre part of the joint, the two rods 86, 87 cross at a right angle in the region of notches 92, 93 having a depth of half the thickness of the corresponding rod so that the axes of these two rods remain in the same plane. The rods are pivotally assembled by a bolt 94, a washer 95 and a nut 96.

Note that the assembly by means of this bolt 94 and nut 96 is carried out easily after breaking the joint by gaining access to the centre part of the bipods through the facing opening defined between two diametrically opposed tabs.

A similar embodiment is shown in cross-section in FIG. 10 in which it can be seen that the cylindrical rollers of the preceding embodiment are replaced by spherical rollers 100 which roll on raceways 101 of toric shape having a circular, or roughly circular, cross-section. The needles 102 of these rollers may be axially stationary with respect to the trunnions or maintained by end walls 103 formed on the rollers as shown in FIG. 10. As these rollers are positioned by the circular-section raceways surrounding the rollers, the spacer members of the preceding embodiment are dispensed with.

FIG. 11 shows a modification of the homokinetic joint according to the invention of particularly cheap construction and characterized in particular in that the shaft sections 6, 7 are constituted by two tubes, namely an outer tube and an inner tube, each comprising at their end adjacent the joint two diametrically opposed notches such as 110, 111, the two notches of one of the tubes being oriented at 90° to the notches of the other tube. Two rods 112, 113 constitute the trunnions and are directly fitted in the associated tubes. These two rods are fixed to each other in the region of their median part by suitable fixing means 114 which extends therethrough, the two rods having in this region two notches 115, 116 whose depth corresponds to half their thickness which permits maintaining their two axes in the same plane perpendicular to the axis Y—Y of the concentric tubes 6 and 7. The rollers 117 carried by each of the trunnions are maintained inwardly by sleeves 118 and outwardly by yokes 119 which have in the presently-described embodiment a shape similar to that shown in FIGS. 1 – 3 but which are fixed by a rivet or the like in the region of their crossing as shown in FIG. 5.

In the case where such an embodiment is employed in a double joint, the assembly is carried out easily in the following manner. After putting the two coaxial tubes together, two of the rods are fitted in the apertures provided for this purpose at the two ends of one of the tubes. Then these two tubes are axially offset with respect to each other by means of the end notches 110, 111 which are provided for this purpose and constitute a clearance $j$ and the other two rods can then be fitted in positon, the placing of the centre fixing means 114 in position terminating the assembly by bringing into the same plane the axes of the trunnions of the two sets of trunnions disposed at a right angle for each one of the two joints disposed at the two ends of the tubes.

This construction is particularly cheap owing to the use of two tubes which have only notches and apertures, all the other parts which constitute the joint being also of very simple shape and construction.

When two joints are provided at the ends of two intermediate concentric shaft sections, a problem arises in the case of a long transmission, that is to say when the two shaft sections must have a relatively great length. This problem is to increase, in order to be able to reach high rotational speeds, the critical speed of the shaft without increasing its torsional rigidity which would adversely affect the good performance of the joint. It is solved in the embodiment shown in FIG. 12 where there are shown two intermediate shafts, namely an outer shaft 6 and inner shaft 7 connected to two joints J, it being assumed that they have a relatively large length compared to their diameter. According to the invention, the rigidity of the assembly is increased by providing an outer tube 120 for stiffening against bending stresses which bears at its ends, and if need be at one or more intermediate points, against the outer connecting shaft 6 through spacer rings 121 which are three in number in the embodiment shown in FIG. 12.

This shaft does not take part in the transmission of the torque but substantially increases the bending strength of the two transmission shafts which may then preserve their torsional deformation capacity necessary for good performance of the joint according to the invention.

In the embodiment shown in FIGS. 13 and 14, this arrangement is slightly modified in that the spacer ring 121 between the shaft 6 and the shaft 130 are advantageously constituted by sectors 132 of a plastics material such as "Nylon" and receive on their periphery an elastomer ring 133 which ensures a radial pre-stressing and a firm support between the stiffening tube 130 and the concentric shafts 6 and 7.

Apart from the main function just described, this arrangement shown in FIGS. 12 – 14 has the further highly important advantage of muffling the sound vibrations coming from the drive unit connected to the transmission.

On the other hand, a problem of a different nature arises in the case of a very short transmission, in order to attain sufficient capacity for torsional deformation for the intermediate shaft sections. This problem is solved in accordance with the invention as shown in FIG. 15 by employing two tubes 150, 151 which are split or slotted longitudinally, the splits 152, 153 formed in each of the two tubes being if desired offset by 180° as shown in FIG. 15 or by 90°.

In the embodiment shown in FIGS. 16 and 17, the first member 160 integral with the driving shaft defines four pairs of raceways 171 of frustoconical shape, the apices of which are located roughly at the centre of the joint. The two sub-assemblies integral with the receiving or driven shaft sections 6, 7 of course comprise two stems 162, 163 each carrying two trunnions 164, 165 on which conical rollers 166, 167 are mounted. The needles 168 of these rollers are maintained inwardly by rings 169, 170 whereas the rollers and the needles are retained outwardly by washers 171 which are maintained in pairs by tie-rods 172, 173 which extend in bores 174, 175 formed in the trunnions and in the stems with which stems these trunnions are integral. The two tierods, constituted by flexible steel wires, cross at the centre of the joint and are fixed by any suitable means. Thus, in the presently-described embodiment they are held stationary by a nut 176 which is clamped on the screwthreaded end of the tie-rod. However, other means may be employed.

It will be understood that, in operation, the centrifugal force exerted on the rollers and on the needles applies the latter against the washers 171 and drives them, together with the tie-rods 172, 173, in an oscillating rotation at the frequency of the rotational speed of the transmission. It will be understood that there is a slight clearance provided between the ends of the trunnions and the washers to permit this movement without friction. Moreover, it may be recalled that, in the course of operation at high speed, and at an angle and carrying torque, that is to say in the most general case, the two rollers which are journalled on the same axis and are retained by the same tie-rod rotate in the same direction and at the same speed at each instant which permits the arrangement just described.

This modification has been shown in the case of conical rollers and raceways which are also conical but it will be understood that a similar arrangement may be employed in the case of cylindrical rollers and planar raceways.

This particular construction, whether it has conical or cylindrical rollers, has the advantage of having an efficiency of practically 1, bearing in mind that the friction is to a great extent eliminated, the residual losses being due solely to rolling phenomena.

In a general way, the various types of embodiments of the joint according to the invention which have been described by way of example in this description have the following advantages, some of which may of course be specific to this or that particular embodiment:

exactly homokinetic operation;
absolutely free axial sliding;
possibility of the use at high speeds, for example of the order of 5,000 to 6,000 rpm, of angles of 10° or 20° or even more;
very long life comparable with or exceeding, that of Cardan joints and very much longer than the life of known sliding homokinetic joints;
small overall size which is equal to, or less than, that of Cardan joints of corresponding mechanical capacity;
very low mechanical losses and also very low heating which allows a good lubrication;
relatively easy manufacture, in particular by means of the most conventional production machines with tolerances current in mass-production.

Although the various embodiments shown and described all comprise two concentric shaft sections, it is possible to envisage providing a plurality of concentric shaft sections, each one carrying two coaxial trunnions, the various axes of these trunnions being contained in the same plane and being angularly evenly spaced apart.

Having now described my invention what I claim as new and desire to secure by Letters Patent is:

1. A homokinetic transmission joint comprising a first element for connection to one of two shafts to be interconnected, a second element for connection to the other of said two shafts, the first element defining $n$ pairs of raceways, $n$ being an even whole number equal to at least 4, the pairs of raceways being disposed symmetrically 2 by 2 with respect to the axis of rotation of the first element and being angularly evenly spaced apart in a plane perpendicular to said axis, said second element comprising $n/2$ concentric shaft sections, each shaft section having a capacity to undergo an elastic deformation in torsion, each of said $n/2$ shaft sections carrying two trunnions, and rollers which are respectively rotatably mounted on the trunnions and are in contact with the respective pairs of raceways, whereby when the joint rotates at an angle the difference in phase between the pairs of rollers is absorbed by the torsion of the concentric shaft sections.

2. A homokinetic joint as claimed in claim 1, wherein the axes of the trunnions carried by the $n/2$ concentric shaft sections are contained in a plane perpendicular to the common axis of the $n/2$ shaft sections.

3. A homokinetic joint as claimed in claim 2, wherein the pairs of raceways are evenly spaced apart around the axis of the first element and the axes of the associated trunnions are also evenly spaced apart around the axis of the concentric shaft sections, said trunnions being grouped in twos and set at 180°, each group being connected to one of the shaft sections.

4. A homokinetic joint as claimed in claim 1, wherein the extents of torsional elasticity of the $n/2$ concentric shaft sections are substantially equal to each other.

5. A homokinetic joint as claimed in claim 1, wherein the extents of torsional elasticity of the $n/2$ concentric shaft sections are equal to each other.

6. A homokinetic joint as claimed in claim 1, wherein sub-assemblies including the trunnions and the rollers respectively associated with the $n/2$ concentric shaft sections have inertias substantially equal to each other.

7. A homokinetic joint as claimed in claim 1, wherein sub-assemblies including the trunnions and the rollers respectively associated with the $n/2$ concentric shaft sections have inertias equal to each other.

8. A homokinetic joint as claimed in claim 1, comprising two concentric shaft sections, namely an outer shaft section and inner shaft section, means being provided for rendering said shaft sections axially fixed relative to each other.

9. A homokinetic joint as claimed in claim 8, wherein said means comprise grooves provided respectively in facing surfaces of the two shaft sections at a distance from the joint and a ring engaged in the grooves.

10. A homokinetic joint as claimed in claim 8, wherein the outer shaft section has an outer stem which comprises for the passage of the trunnions integral with the inner shaft section openings of oblong shape the dimensions of which openings in a direction parallel to the axis of the two concentric shaft sections and perpendicular to said direction being respectively substantially equal to and greater than that of means which extend therethrough.

11. A homokinetic joint az claimed in claim 1, comprising means located at a distance from the centre of the joint for connecting the concentric shaft sections so that they rotate with each other.

12. A homokinetic joint as claimed in claim 1, wherein the first element is provided along an inner free edge with a flange whose function is to ensure the axial retention of joint elements associated with the concentric shaft sections.

13. A homokinetic joint as claimed in claim 1, comprising two shaft sections, namely an outer shaft section and an inner shaft section, each shaft section being integral with a stem, the stem of the inner shaft section having a cylindrical shape, the stem of the outer shaft section defining openings and a bore of shape corresponding to said cylindrical shape and receiving said stem of the inner shaft section, stem of the outer shaft section being integral with two trunnions and the stem of the inner shaft section being also integral with two trunnions which extend radially through the openings of the stem of the outer shaft section.

14. A homokinetic joint as claimed in claim 13, wherein the first element defines a spherical inner surface and the stem integral with the outer shaft section has a corresponding spherical surface the two spherical surfaces defining a small clearance therebetween.

15. A homokinetic joint as claimed in claim 1, comprising two concentric shaft sections, each shaft section terminating in a substantially bell-shaped part, the two bell-shaped parts partly surrounding the first element and each comprising two diametrically opposed portions between which opposed portions the trunnions are fixed.

16. A homokinetic joint as claimed in claim 1, wherein the first element defines an inner surface of spherical shape in which is mounted a member defining an outer spherical surface and integral with the trunnions respectively associated with the concentric shaft sections.

17. A homokinetic joint as claimed in claim 1, wherein the concentric shaft sections are tubular and directly carry the associated trunnions, each tubular shaft section defining notches for the passage of the trunnions associated with another of the tubular shaft sections.

18. A homokinetic joint as claimed in claim 1, wherein $n = 4$ and at least one of the groups of two trunnions associated with one of the two shaft sections is defined on a single rod, passages provided in the other shaft section receiving said rod.

19. A homokinetic joint as claimed in claim 18, wherein the pair of trunnions associated with each one of the two shaft sections is defined on a single rod, the two rods have their axes contained in the same plane and means interconnect the rods.

20. A homokinetic joint as claimed in claim 19, wherein the two rods comprise in their median part where they cross each other a notch having a depth equal to one half of the thickness of the rod and they are interconnected in the region of said notches.

21. A homokinetic joint as claimed in claim 1, wherein the rollers are maintained radially inwardly of the joint by spacer members and radially outwardly of the joint by raceways whose shape outwardly retains the rollers.

22. A homokinetic joint as claimed in claim 1, wherein the rollers are maintained radially inwardly of the joint by spacer members and radially outwardly of the joint by yokes cooperating respectively with the associated with one of the concentric shaft sections.

23. A homokinetic joint as claimed in claim 1, wherein the rollers are maintained radially inwardly of the joint by spacer members and radially outwardly of the joint by spacer rings bearing against a member integral with the corresponding shaft section.

24. A homokinetic joint as claimed in claim 1, wherein the rollers are maintained radially inwardly of the joint by spacer members and radially outwardly of the joint by tie-rods which extend in bores in the trunnions coaxial with the axes of the rollers and are each associated with two diametrically opposed rollers.

25. A homokinetic joint as claimed in claim 22, wherein the yokes are in contact by opposed branches with end faces of the rollers but are not in contact with the associated trunnions and they comprise retaining means avoiding their accidental disengagement.

26. A homokinetic joint as claimed in claim 22, wherein each roller bears by an end face against a washer centered with respect to the corresponding trunnion, a branch of the yoke comprising a boss in contact with the washer in the vicinity of the axis of the trunnion.

27. A homokinetic joint as claimed in claim 11, wherein at least one of the concentric shaft sections comprises a longitudinal slot.

28. An assembly comprising two homokinetic joints, each joint comprising a first element and a second element, the first element defining $n$ pairs of raceways, $n$ being an even whole number equal to at least 4, the pairs of raceways being disposed symmetrically 2 by 2 with respect to the axis of rotation of the first element and being angularly evenly spaced apart in a plane perpendicular to said axis, said second element comprising $n/2$ concentric shaft sections, each shaft section having a capacity to undergo an elastic deformation in torsion, each of said $n/2$ shaft sections carrying two trunnions, and rollers which are respectively rotatably mounted on the trunnions and are in contact with the respective pairs of raceways, whereby when the joint rotates at an angle, the difference in phase between the pairs of rollers is absorbed by the torsion of the concentric shaft sections; the two joints being interconnected by the concentric shaft sections which are free to rotate with respect to each other in a region thereof between said two joints; a tube extending on at least a part of the length of said region around an outer shaft section of said shaft sections; and spacer members disposed between said outer shaft section and the tube.

* * * * *